United States Patent [19]

Robinson

[11] 3,852,528

[45] Dec. 3, 1974

[54] MESSAGE DISPLAY DEVICE

[76] Inventor: Gilbert A. Robinson, 2441 E. Hemosa, Tempe, Ariz. 85282

[22] Filed: Oct. 23, 1973

[21] Appl. No.: 408,738

[52] U.S. Cl..... 178/7.88, 178/DIG. 1, 178/DIG. 30, 40/52 R, 40/77.8

[51] Int. Cl. .......... H04n 5/24

[58] Field of Search....... 178/7.88, DIG. 1, DIG. 30; 40/52 R, 68, 77.8

[56] References Cited

UNITED STATES PATENTS

| | | | |
|---|---|---|---|
| 1,354,261 | 9/1920 | Mather | 40/77.8 |
| 3,307,170 | 2/1967 | Aoyama | 40/52 R |
| 3,477,782 | 11/1969 | Sherwin | 178/7.88 |
| 3,626,094 | 12/1971 | Widderkind | 178/7.88 |

*Primary Examiner*—Howard W. Britton
*Attorney, Agent, or Firm*—Warren F. B. Lindsley

[57] ABSTRACT

Apparatus for displaying sequentially one or more message cards individually or in combination with information from a digital read-out meter for a television camera comprising a rotating cylinder or carousel having message cards mounted about its periphery which move across the field of view of the television camera as the carousel rotates. The images of the two display devices individually or in combination may be displayed to the television camera, one above the other.

12 Claims, 5 Drawing Figures

MESSAGE DISPLAY DEVICE

BACKGROUND OF THE INVENTION

The programming of television broadcasting, especially in the case of local stations, often includes the display of weather information including temperature, barometric pressure, wind velocity and direction along with time and advertising or other types of messages. Economy and convenience in the display of such messages has been provided by automatic equipment which is designed to display this information sequentially in a manner that is effective and pleasing to the television viewer.

DESCRIPTION OF THE PRIOR ART

Various types of equipment are available which provide automatic scanning of a series of such messages.

Such prior art equipment employs in one case a revolving message carrier which moves a large number of message cards across the field of view of the television camera. In another case, a revolving mirror scans a set of stationary meters and limited number of message cards, directing images of the individual displays sequentially to the camera field of view. Unfortunately, such prior art equipment is expensive and yet limited in flexibility. It is not possible, for example, to display with any one such prior art device a set of meter faces interspersed with a large number of message cards, nor is it possible to show these two types of displays simultaneously.

In a copending application, the inventor sets forth an apparatus which overcomes the limitations of the prior art but which, by the nature of its mechanical construction, requires the use of brushes and commutating rings to conduct electrical signals to display devices mounted in a rotating carousel.

Because it is always desirable to provide any given function at a lower cost and in a form requiring less maintenance, there is a need for an improved message display device incorporating the features offered in the copending application in a simplified, improved version.

SUMMARY OF THE INVENTION

Therefore, in accordance with the invention claimed, an improved automatic message display device is provided which permits simultaneous display of message cards and a digital read-out device on the television viewing screen. The unique design of the equipment affords a high degree of flexibility at low cost.

It is, therefore, one object of this invention to provide a new and improved automatic display device for television broadcasting.

Another object of the invention is to provide such an improved automatic display device which has a capability of displaying sequentially a multiplicity of message cards containing advertising or other information.

A further object of the invention is to provide such an automatic display device which displays digital information from a digital read-out meter.

A still further object of this invention is to provide an automatic display device capable of displaying both message cards and digital meter information simultaneously, one positioned above the other.

A still further object of this invention is to provide an automatic display device which provides a high degree of flexibility incorporating all of the aforementioned functions in a single low-cost apparatus.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawing, in which.

DESCRIPTION OF THE PREFERRED EMBODIMENT

Figure 1:
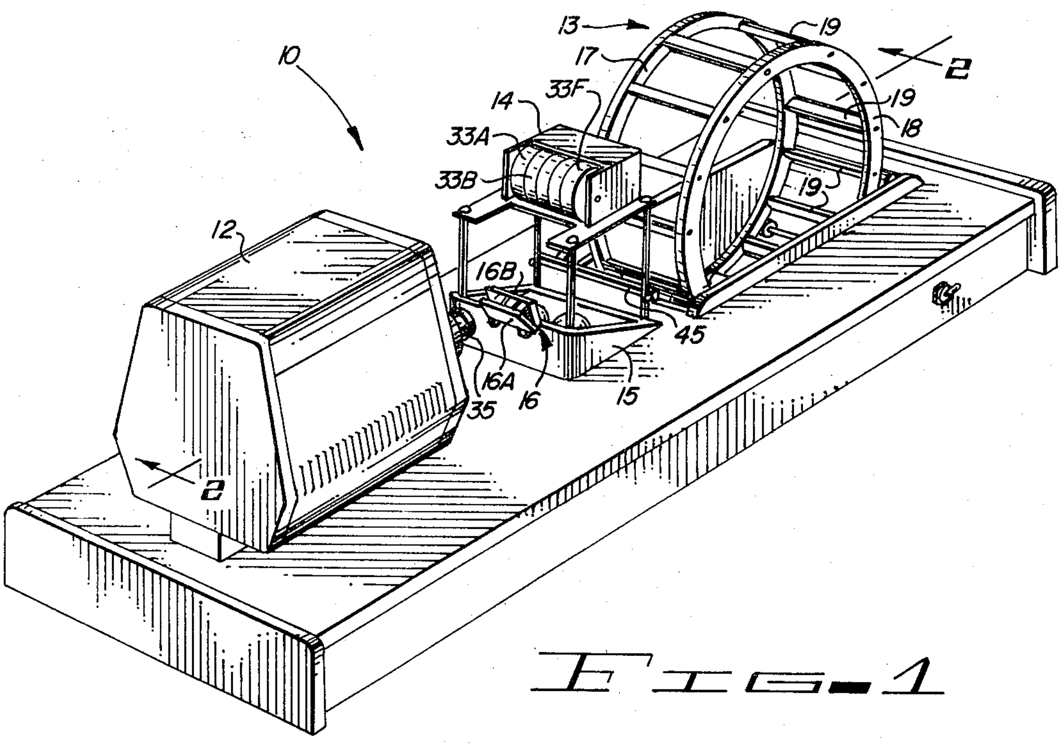
FIG. 1 is a perspective view of a message display device embodying my invention.

Referring more particularly to the drawing by characters of reference, FIG. 1 discloses an automatic message display device 10 comprising a mounting platform 11, television camera 12, message card display assembly, cylinder or carousel 13, digital read-out device such as, for example, meter 14, illumination assembly 15 and mirror assembly 16.

Figure 2:
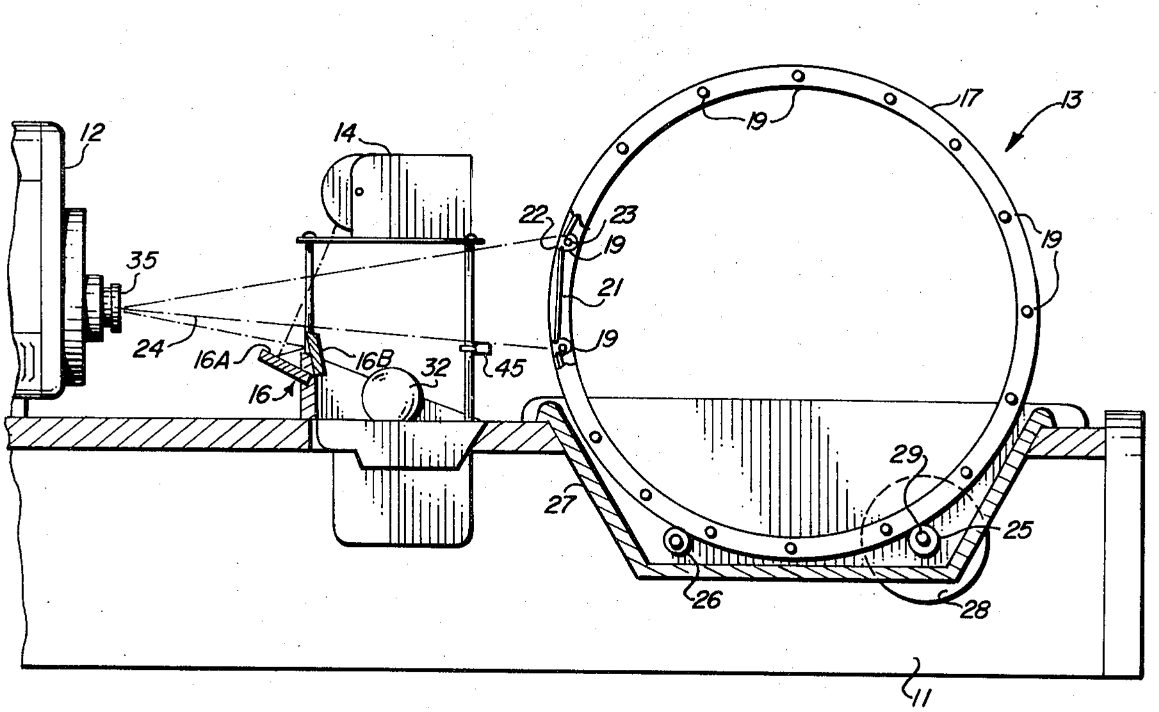
FIG. 2 is a sectional view of the display device shown in FIG. 1 taken along line 2—2.

The carousel 13 comprises a pair of parallel flat rings 17 and 18 spaced apart at a distance slightly larger than the width of the usual calling or message cards and joined together by a multiplicity of cross-bars 19 uniformly spaced about the circumferences of the rings. The adjacent cross-bars 19 are spaced apart a distance equal to the width of the message cards which are to be displayed. One such message card 21 is shown in cross-sectional view in FIG. 2. FIG. 2 also illustrates a notch 22 in cross bar 19 for grasping and holding the edge of the message card in a rack-like configuration. A screw 23 passing through the outside rings secures the cross bar to rings 17 and 18. As noted, the outer surface of the display device comprises a plurality of racks, each for receiving a similarly shaped message or calling card.

Carousel 13 is mounted such that the plane surfaces of rings 17 and 18 are oriented vertically and parallel with the viewing axis 24 of the television camera 12, the outer circumferences of the rings 17 and 18 resting on a pair of rollers including a drive roller 25 and an idler roller 26 located near the bottom of a recess 27 in mounting platform 11. The surfaces of rollers 25 and 26 may be of rubber or other similar material that ensures adequate frictional engagement between drive roller 25 and rings 17 and 18 and also to ensure quiet operation as the carousel is turned slowly about its longitudinal axis, which is located centrally of rings 17 and 18. The rotational drive effort of the carousel is supplied by a gear motor 28 concealed within the mounting platform 11 with its shaft 29 coupled directly to drive roller 25. As drive roller 25 is turned slowly by motor 28, carousel 13 rotates about its axis displaying cards mounted on its periphery slowly across the field of view of television camera 12.

As display carousel 13 rotates, the image of the message card as seen on the television receiver moves slowly upward or downward, depending upon the direction of its rotation.

Card 21 shown in position for viewing is illuminated by lamp 32 which is mounted in illumination assembly 15. Illumination assembly 15 is suitably fashioned to reflect and direct light to the display card and incorporates an electrical socket for holding lamp 32.

As a further embodiment of the invention, a second information display means in the form of the digital read-out meter 14 may be employed. Read-out meter 14 has a multiplicity of individually rotatable cylinders 33A through 33F, each of which has alpha or numeric characters printed on its outer cylindrical surface. The rotational positions of the individual cylinders 33A-33F are controlled by electrical signals supplied to read-out meter 14 in a manner such that the series of characters aligned along a viewing window in the read-out meter may display such current information as time, temperature, etc. The image of these aligned characters is picked up by mirror 16A and reflected by mirror 16A to mirror 16B, from which it is reflected again into the lens 35 of television camera 12.

Figure 3:
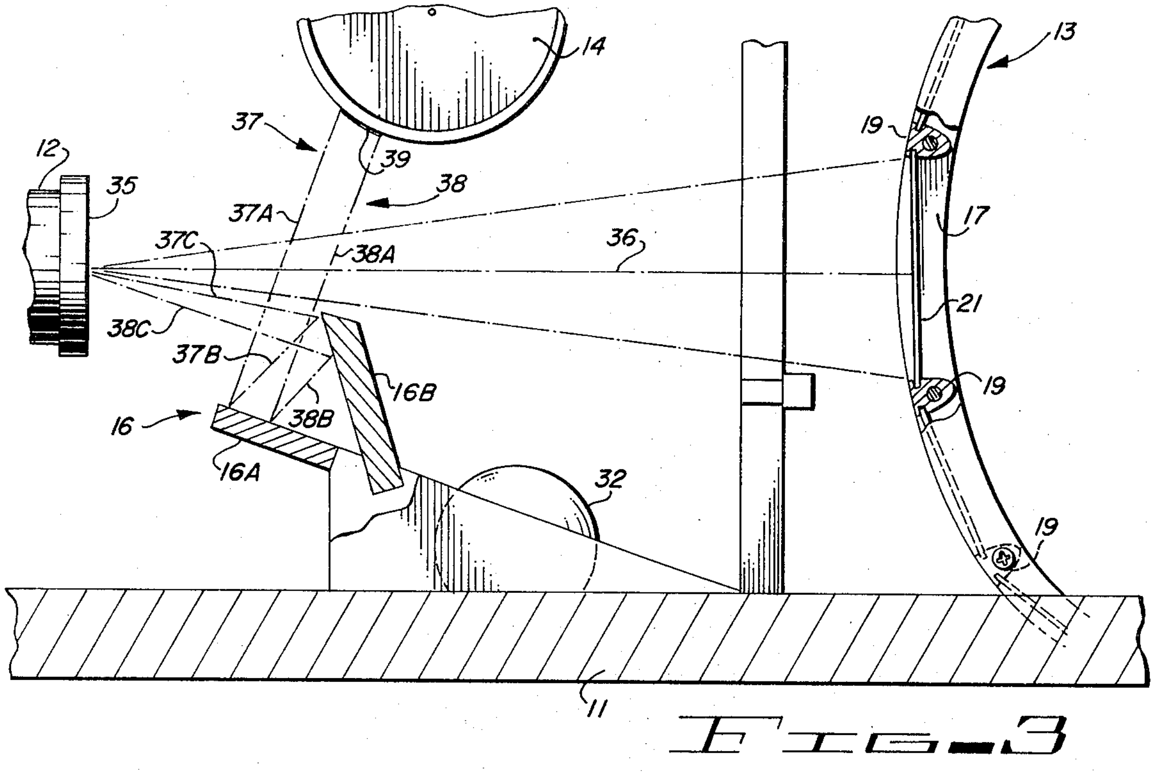
FIG. 3 is an enlargement of a portion of FIG. 2 illustrating the optical projection of images to the viewing camera.

A more detailed illustration of the optical arrangement of the display device 10 is shown in FIG. 3. Display card 21 is viewed directly by camera 12, its image being projected along ray 36. The projection path for the images of the alpha and numeric characters diaplayed by read-out meter 14 is shown by a pair of rays 37 and 38. The first ray 37 is shown to originate from the top of a character 39 on one of the cylinders of meter 14 and a second ray 38 is shown to originate from the bottom of characters 39. A first segment 37A of ray 37 passes from read-out meter 14 to mirror 16A and is reflected as segment 37C into lens 35 of television camera 12. In the reflection of segment 37A from mirror 16B, the angle of reflection is equal to the angle of incidence. Similarly, segment 38A of ray 38 emanating from the bottom of character 39 passes to mirror 16A and is reflected as segment 38B to mirror 16B, and is further reflected therefrom as segment 38C into lens 35. It will be noted that rays 37 and 38 follow paths from character 39 to mirrors 16A and 16B and thence to camera 12. Moreover, ray 37A which originates at the top of character 39 enters lens 35 in a position above ray 38 which originates at the bottom of character 39 so that the image of character 39 as recognized by camera 12 is in an upright position as desired. It should be recognized that only two rays are described for purposes of illustration; however, each image received by the camera comprises an infinite number of rays.

The position of lamp 32 as shown in FIG. 3 is appropriate to allow illumination therefrom to reach both the display card 21 of carousel 13 and the characters 39 of read-out meter 14.

Figure 4:
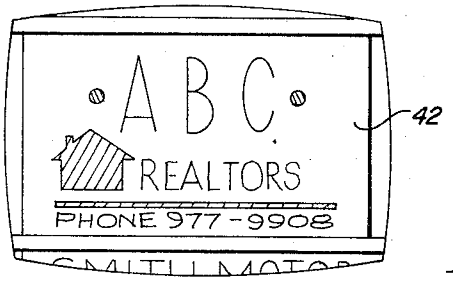
FIG. 4 illustrates a message card image on a television screen when the display device is displaying only message cards to the camera.

The image 42 of the display card 21 as viewed by camera 12 in the first embodiment of the invention, where only the carousel 13 is in view of the camera, is shown in FIG. 4.

Figure 5:
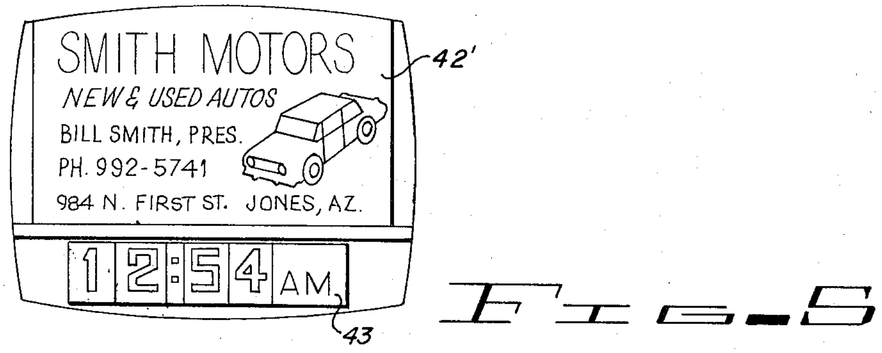
FIG. 5 illustrates the image on a television screen of a message card and a digital read-out device as they appear simultaneously when the message display device disclosed is displaying such information.

In the second embodiment of the invention, the image 42' of a display card is seen above the image 43 of the read-out meter display as shown in FIG. 5. In FIG. 5, advertising information from display card 21 is shown simultaneously with digital read-out meter information giving the time of day. Other types of information from both sources, of course, may be conveniently displayed.

In order to more clearly separate the two fields of view shown on the picture seen on television, bar 45 is mounted on platform 11 and particularly the illuminating assembly 15. This bar is seen by the camera and divides the picture into two segments, as shown in FIG. 5.

It will be recognized by those familiar with other available equipment serving a similar purpose that the apparatus described is relatively simple in construction. In the first embodiment the rigid structure of the carousel 13 is turned by a single drive roller 25 turned by motor 28. No other moving parts are involved. If the read-out meter fails in operation, it may readily be replaced as a unit. Since drive motor 28 may be of a type that is self-lubricating, little or no maintenance is required.

It should be noted that display assembly 13 may rotate continuously so that the upper image moves continuously in an upward or downward direction; the image changing continuously from one to the next adjacent message card mounted on the respective display assembly. Variations of the mode of operation including rests at each display position or stepping of display positions for the card carrying carousel are intended to be within the scope of this invention. Manual stepping of display positions is also recognized as an obvious variation. Display cards may be replaced during operation if desired. Additional applications of the invention will also be readily apparent as, for example, the monitoring of scientific experiments as in the case of space flights when rocket engine performance indications are monitored and displayed at a control console.

While only two embodiments of the present invention have been illustrated and described, it will be apparent to those skilled in the art that various changes and modifications may be made therein without departing from the spirit of the invention or from the scope of the appended claim.

What is claimed is:

1. A message display device comprising in combination:

a frame, a display assembly having a cylindrically shaped display surface rotatably mounted on said frame for presenting sequentially its display surfaces to a viewer mountable on said frame, said surface defining a plurality of areas sequentially positioned around said display surface, each for receiving and holding a plurality of replaceable display items, means mounted on said frame for rotating said display assembly about a fixed axis, said means comprising a drive shaft for engaging a peripheral surface of said display assembly for rotation thereof about its longitudinal axis, and illumination means for illuminating each item as it sequentially comes into view of the viewer upon rotation of said display assembly.

2. The message display device set forth in claim 1 wherein:

said surface is provided with a plurality of racks sequentially spaced around said display surface each for receiving a different display item.

3. The message display device set forth in claim 1 wherein:

said surface is provided with a plurality of like-shaped racks for receiving similarly shaped message cards.

4. The message display device set forth in claim 1 in further combination with:

a television camera mounted on said frame as said viewer.

5. The message display device set forth in claim 1 in further combination with:

a second display device mounted on said frame for presenting its display surfaces to a mirror assembly, a mirror assembly mounted on said frame adjacent said second display device for receiving images of said display surfaces of said second display device and transmitting them as real images to said viewer juxtapositioned to the images received from the cylindrically shaped display surface.

6. The message display device set forth in claim 5 wherein:

said second display device comprises a digital read-out meter.

7. The message display device set forth in claim 5 in further combination with:

a television camera mounted on said frame as said viewer.

8. The message display device set forth in claim 1 wherein:

said cylindrically shaped display surface is mounted on said frame for rotation about its longitudinal axis which is parallelly arranged with the longitudinal axis of said frame.

9. The message display device set forth in claim 8 wherein:

said frame is provided with an indentation in its top, and said cylindrically shaped display surface is mounted for rotation within said indentation.

10. The message display device set forth in claim 9 in further combination with:

a second display device mounted on said frame for presenting its display surfaces to a mirror assembly and to said illumination means, a mirror assembly on said frame adjacent said second display device for receiving images of said display surfaces of said second display device and transmitting them as real images to said viewer juxtapositioned to the images received from the cylindrically shaped display surface.

11. The message display device set forth in claim 9 wherein:

said drive shaft is mounted on said frame within said indentation for supporting and driving said cylindrically shaped display surface.

12. The message display device set forth in claim 11 in further combination with:

an idle roller mounted in said indentation, said idle roller and said drive shaft supporting said cylindrically shaped display surface within said indentation.

* * * * *